United States Patent [19]

Cho et al.

[11] Patent Number: 5,744,894

[45] Date of Patent: Apr. 28, 1998

[54] BRUSHLESS MOTOR HAVING A FIELD MAGNET, A PORTION OF WHICH IS USED FOR DETECTING THE ROTOR'S POSITION

[75] Inventors: Jae-sung Cho; In-jae Lee, both of Incheon, Rep. of Korea

[73] Assignee: Dongyang Mechatronics Corporation, Incheon, Rep. of Korea

[21] Appl. No.: 733,946

[22] Filed: Oct. 21, 1996

[30] Foreign Application Priority Data

Oct. 26, 1995 [KR] Rep. of Korea ............. 95-37309

[51] Int. Cl.$^6$ ........................................ H02K 21/22
[52] U.S. Cl. .................... 310/261; 310/68 B; 310/156; 310/DIG. 3
[58] Field of Search .................. 310/156, 68 B, 310/193, 191, 209, DIG. 3

[56] References Cited

U.S. PATENT DOCUMENTS

| | | | |
|---|---|---|---|
| 4,130,769 | 12/1978 | Karube | 310/46 |
| 4,562,399 | 12/1985 | Fisher | 322/94 |
| 4,737,647 | 4/1988 | Miyao | 310/268 |
| 4,893,040 | 1/1990 | Turner et al. | 310/156 |
| 5,038,065 | 8/1991 | Matsubayashi et al. | 310/162 |
| 5,053,664 | 10/1991 | Kikuta et al. | 310/144 |
| 5,095,238 | 3/1992 | Suzuki et al. | 310/156 |

*Primary Examiner*—Thomas M. Dougherty
*Assistant Examiner*—Tran N. Nguyen
*Attorney, Agent, or Firm*—Morgan & Finnegan, LLP

[57] ABSTRACT

A brushless motor is provided. The brushless motor of the present invention includes a shaft, a rotor, having a plurality of field magnets attached thereto, fixed to the shaft, a stator for forming a magnetic field to enable rotation of the rotor, a housing in which the rotor and stator are installed, and a motor driving unit, wherein the arc length of a portion of the field magnet used for detecting the position of the rotor and that of the remaining portion thereof are formed to be different from each other.

According to the brushless motor of the present invention, it is possible to increase efficiency of the brushless motor and to reduce manufacturing costs.

2 Claims, 4 Drawing Sheets

5,744,894

BRUSHLESS MOTOR HAVING A FIELD MAGNET, A PORTION OF WHICH IS USED FOR DETECTING THE ROTOR'S POSITION

BACKGROUND OF THE INVENTION

The present invention relates to a brushless motor, and more particularly, to a brushless motor which can save costs and increase efficiency by manufacturing a portion thereof for detecting the position of a rotor with respect to a field magnet in one body without separately installing a phase delay circuit for detecting the position of the rotor.

Generally, a brushless motor includes a rotor, a stator for forming a magnetic field which enables the rotor to rotate, a housing in which the rotor and stator are loaded, and a driving unit. In such a brushless motor, a core of the stator is generally fixed to an internal wall of the housing and the rotor is rotatably set in an internal space of the stator. However, to the contrary, the stator may be located in the internal space of the rotor. Namely, the rotor surrounds the stator and rotates around the outside of the stator.

FIGS. 1 and 2 show the rotor of a conventional brushless motor, in which FIG. 1 is a perspective view of the rotor which rotates inside the stator and FIG. 2 is a perspective view of the rotor which rotates around the outside of the stator.

Referring to FIG. 1, a conventional rotor 10 which rotates inside of the stator includes a shaft 11, a rotor core 12 fixed to the shaft 11 and a plurality of field magnets 13a–13d formed of permanent magnets which are fixed to the circumference of the rotor core 12 with a predetermined interval. The rotor 10 having such a structure is set in the internal space of the stator (not shown) and rotates.

Also, referring to FIG. 2, a rotor 20 which rotates around the outside of the stator includes a shaft 21, a rotor yoke 22 fixed to the shaft 21 and a plurality of field magnets 23a–23d formed of permanent magnets which are fixed to the internal wall of the rotor yoke 22 with a predetermined interval. The stator (not shown) is set in the inside of the rotor 20 having such a structure. Therefore, the rotor 20 rotates around the outside of the stator.

In the rotors 10 and 20, having the above structure, since the arc length of a portion A of a field magnet 13a(23a), which is used for detecting the position of the rotor and that of a portion B, which interacts with a magnetic field generated by current flowing through a stator coil (not shown), are identical, as shown in FIG. 3, a voltage is applied to sections a–b, c–e and f–g in which electromotive force E is small as shown in FIG. 4, thus generating sections a–b, c–e and f–g in which load current is rapidly increased. Accordingly, power consumption increases, efficiency of the brushless motor decreases, and heat is generated inside of the brushless motor.

Therefore, a method for solving the problems due to the sections a–b, c–e and f–g in which the load current is rapidly increased has been developed, in which an input voltage is not applied to the concerned sections a–b, c–e and f–g. In the conventional technology, a position detecting magnet is added separately from the field magnet or a phase delay circuit 51a for reading a position detecting signal S, detected by a position detecting sensor (not shown), is added to a driving unit 51 of the brushless motor, as shown in FIG. 5, to prevent voltage from being applied to the concerned sections a–b, c–e and f–g. In FIG. 5, reference numerals 51b and 51c respectively denote an amplifying circuit for amplifying a signal and a motor driving circuit for outputting a signal for driving a brushless motor M.

To add the position detecting magnet or the phase delay circuit 51a, as mentioned above, increases the efficiency of the brushless motor, however, complicates the driving unit 51 of the brushless motor and increases the manufacturing costs thereof.

SUMMARY OF THE INVENTION

It is an object of the present invention to provide a brushless motor which can increase efficiency and lower manufacturing costs by simplifying the design thereof.

To achieve the above object, there is provided a brushless motor according to the present invention, comprising a shaft, a rotor, having a plurality of field magnets attached thereto, fixed to the shaft, a stator for forming a magnetic field to enable rotation of the rotor, a housing in which the rotor and stator are installed, and a motor driving unit, wherein the arc length of a portion of the field magnets used for detecting the position of the rotor and that of the remaining portion thereof are formed to be different from each other.

BRIEF DESCRIPTION OF THE DRAWINGS

The above object and advantages of the present invention will become more apparent by describing in detail a preferred embodiment thereof with reference to the attached drawings in which.

DETAILED DESCRIPTION OF THE INVENTION

Figure 6:
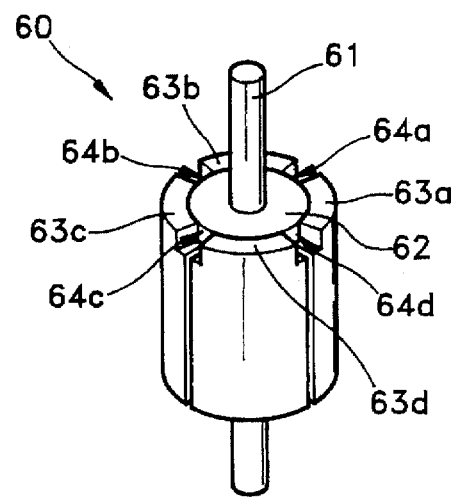
FIG. 6 is a perspective view of a rotor which rotates inside a stator of a brushless motor according to the present invention.
Figure 9:
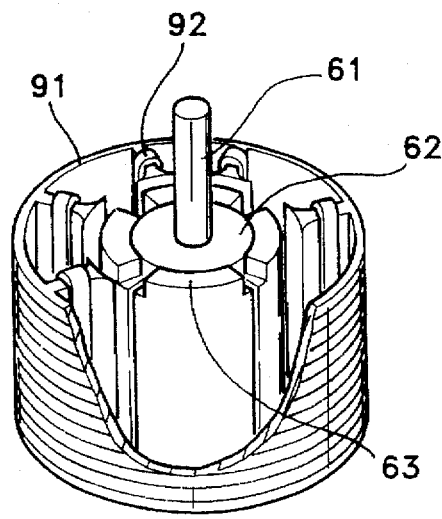
FIG. 9 is a partial perspective view showing the internal structure of the brushless motor according to the present invention.

Referring to FIG. 6, a rotor 60 which rotates inside a stator of a brushless motor according to the present invention includes a shaft 61, a rotor core 62 fixed to the shaft 61 and a plurality of field magnets 63a–63d formed of permanent magnets which are fixed to the circumference of the rotor core 62 with a predetermined interval. The rotor 60 having such a structure is installed in a space prepared inside a stator core 91 around which a stator coil 92 is wound as shown in FIG. 9.

Figure 7:
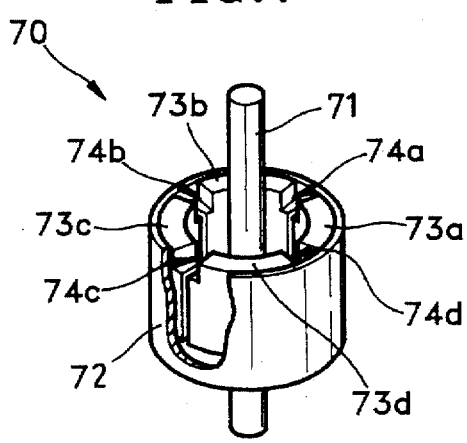
FIG. 7 is a perspective view of a rotor which rotates around the outside of a stator of a brushless motor according to the present invention.
Figure 8:
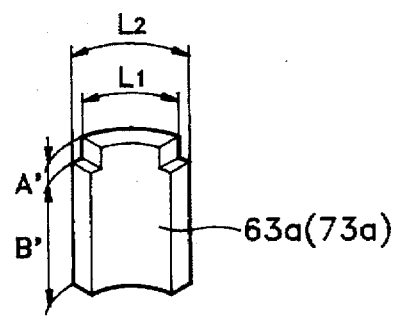
FIG. 8 is a perspective view of a field magnet of the rotor of FIGS. 6 and 7.

Also, referring to FIG. 7, a rotor 70 which rotates around the outside of a stator of a brushless motor according to the present invention includes a shaft 71, a yoke 72 fixed to the shaft 71 and a plurality of field magnets 73a–73d formed of permanent magnets which are fixed to the internal wall of the rotor yoke 72 with a predetermined interval.

In the rotors 60 and 70 having the above structure, the field magnets 63a and 73a are formed to have a notched section in each upper corner thereof so that the arc length L1 of a portion A' which is used for detecting the position of the rotor is relatively shorter than the arc length L2 of a portion B' which interacts with a magnetic field generated by current flowing through the stator coil 92.

Figure 10:
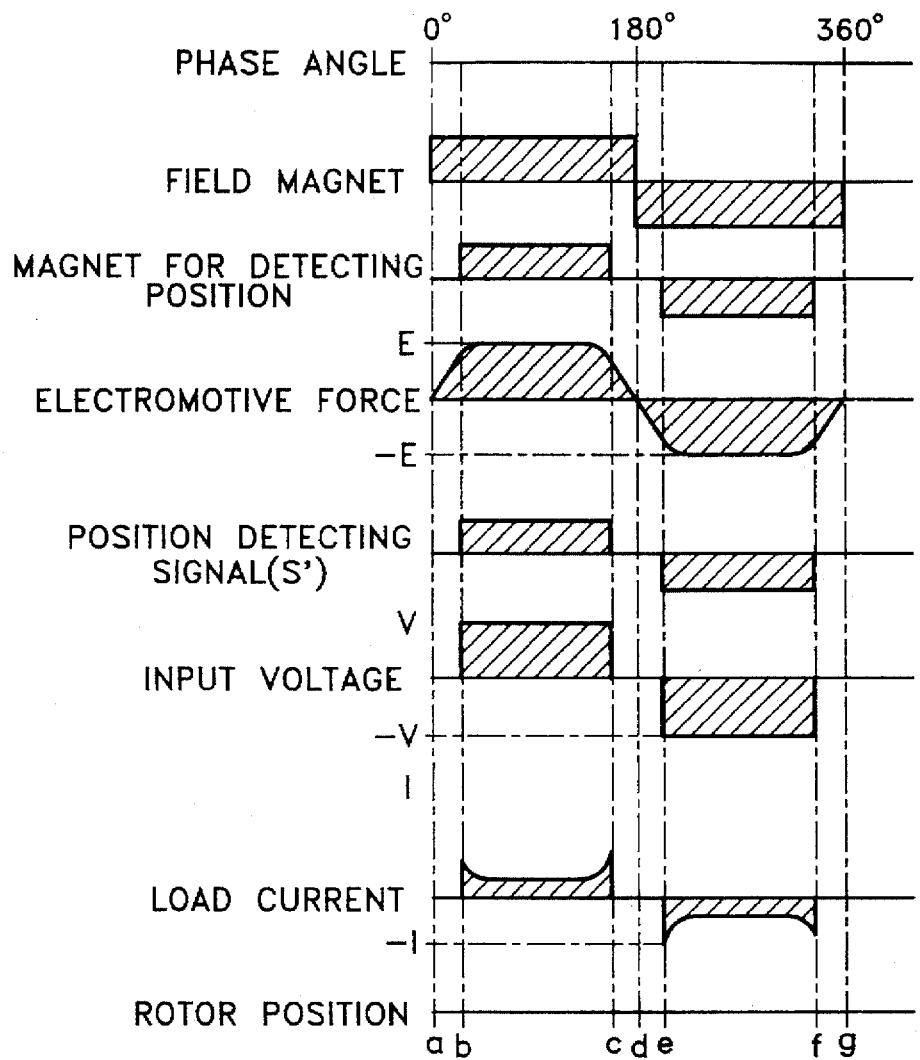
FIG. 10 shows various characteristics of the brushless motor according to the present invention.

Therefore, as shown in FIGS. 6 and 7, portions 64a–64d and 74a–74d, which have a width wider than the gap between the B' portions and are not affected by the magnetic field of the stator, are formed by the notched sections in adjacent A' portions. Accordingly, since a position detecting signal S' is not generated in sections a–b, c–e and f–g in which electromotive force E is small as shown in FIG. 10, an input voltage V is not applied to the concerned sections. Thus, rapid increase of a load current does not exist in the sections a–b, c–e and f–g, unlike in the conventional technology. Therefore, power consumption is reduced and generation of heat is prevented.

Figure 1:
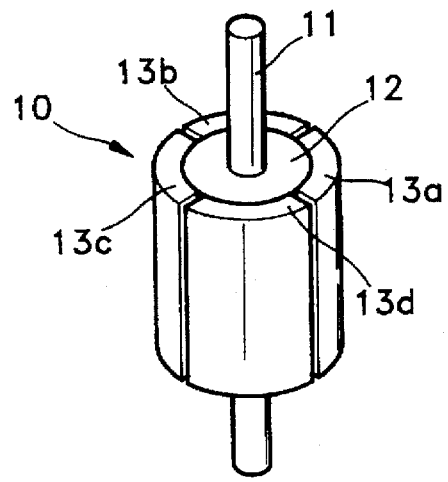
FIG. 1 is a perspective view of a rotor which rotates inside a stator of a conventional brushless motor.
Figure 2:
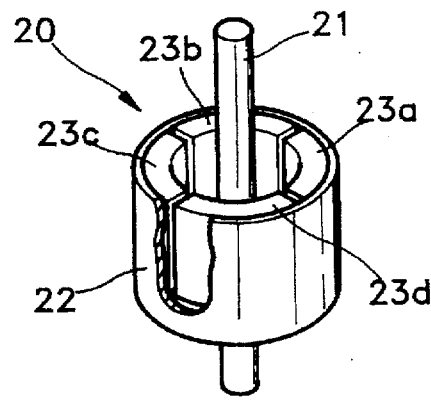
FIG. 2 is a perspective view of a rotor which rotates around the outside of a stator of a conventional brushless motor.
Figure 3:
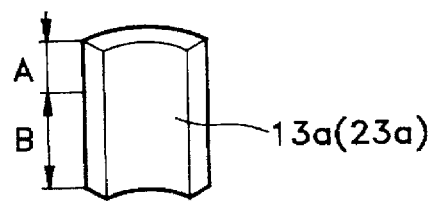
FIG. 3 is a perspective view of a field magnet of the rotor of FIGS. 1 and 2.
Figure 4:
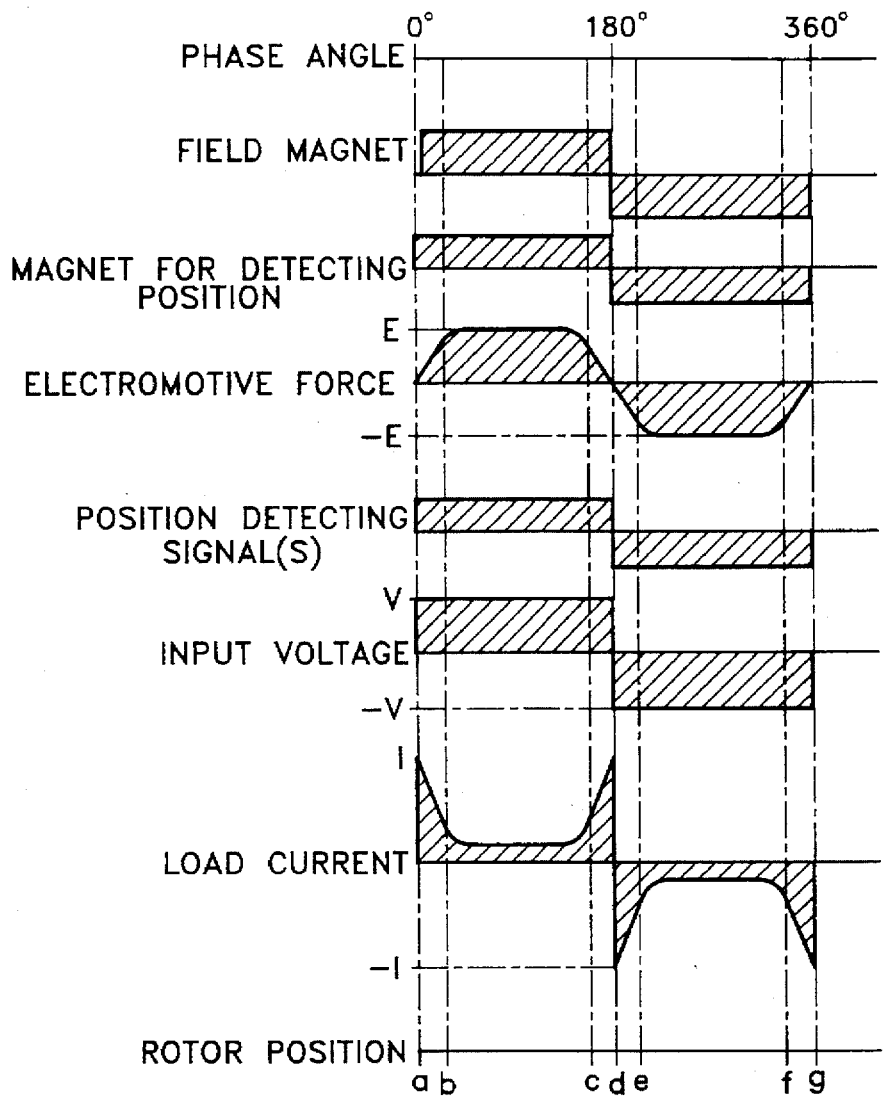
FIG. 4 shows various characteristics of a conventional brushless motor.
Figure 5:
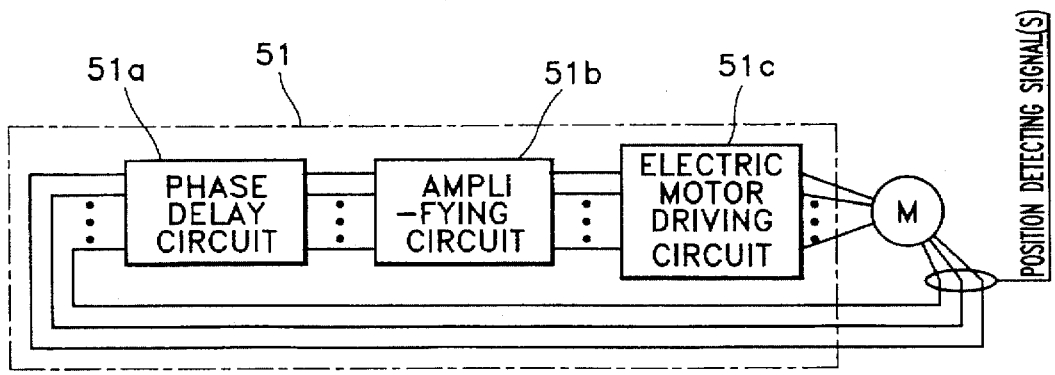
FIG. 5 is a block diagram of a driving unit of a conventional brushless motor.
Figure 11:
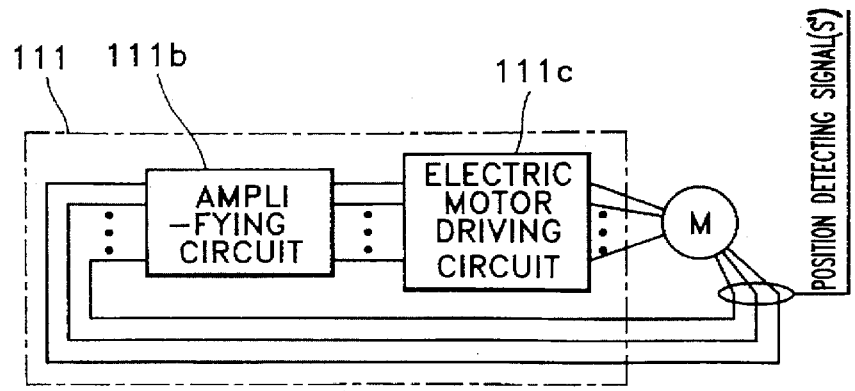
FIG. 11 is a block diagram of the driving unit of the brushless motor according to the present invention.

Also, the portions 64a–64d and 74a–74d which are not affected by the magnetic field function as the phase delay circuit 51a included in the conventional motor driving unit 51 shown in FIG. 5. Thus, the phase delay circuit 51a is not included in a motor driving unit 111 of the present invention as shown in FIG. 11. Therefore, it is possible to increase the efficiency of the brushless motor as compared with a conventional brushless motor employing a motor driving unit which does not have a phase delay circuit without the position detecting magnet. Also, the cost of manufacturing the brushless motor is reduced since the circuit structure thereof is simplified as compared with the driving unit 51 of the conventional brushless motor shown in FIG. 5.

As described above, in the brushless motor according to the present invention, it is possible to decrease the power consumption and increase the efficiency of the brushless motor by controlling the input voltage by forming the portions, which are not affected by the magnetic field, for detecting the position of the rotor in the field magnet of the rotor. Also, it is possible to reduce manufacturing costs since a phase delay circuit and a position detecting magnet are not required in the motor driving unit.

What is claimed is:

1. A brushless motor comprising:

a shaft;

a rotor, having a plurality of field magnets attached thereto, fixed to said shaft;

a stator for forming a magnetic field to enable rotation of said rotor; and a housing in which said rotor and stator are installed, wherein each of the field magnets having two end portions, wherein one end portion, used for detecting a position of said rotor, being configured with a notched section in each upper corner to form an arc length that is different from the other arc length of the remaining end portion thereof.

2. A brushless motor as claimed in claim 1, wherein the arc length of the portion of said field magnets used for detecting the position of said rotor is formed to be shorter than that of said remaining portion thereof.

* * * * *